US012373434B2

(12) United States Patent
Mouleeswaran et al.

(10) Patent No.: US 12,373,434 B2
(45) Date of Patent: Jul. 29, 2025

(54) HEURISTIC DATABASE QUERYING WITH DYNAMIC PARTITIONING

(71) Applicant: Palo Alto Networks, Inc., Santa Clara, CA (US)

(72) Inventors: Chandra Biksheswaran Mouleeswaran, Cupertino, CA (US); Amit Agarwal, Cupertino, CA (US); Prashant Kumar Pathak, San Jose, CA (US); Xiaoyan Wang, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/440,624

(22) Filed: Feb. 13, 2024

(65) Prior Publication Data

US 2024/0184782 A1    Jun. 6, 2024

Related U.S. Application Data

(63) Continuation of application No. 17/815,969, filed on Jul. 29, 2022, now Pat. No. 11,941,006.

(51) Int. Cl.
*G06F 16/2455*  (2019.01)
*G06F 16/2453*  (2019.01)
*G06F 16/2458*  (2019.01)

(52) U.S. Cl.
CPC .... *G06F 16/2455* (2019.01); *G06F 16/24542* (2019.01); *G06F 16/2471* (2019.01)

(58) Field of Classification Search
None
See application file for complete search history.

(56) References Cited

U.S. PATENT DOCUMENTS

| | | | |
|---|---|---|---|
| 8,086,598 B1 | 12/2011 | Lamb et al. | |
| 8,126,870 B2* | 2/2012 | Chowdhuri | G06F 16/24532 707/713 |
| 8,977,600 B2* | 3/2015 | Crupi | G06F 16/951 707/688 |
| 9,734,180 B1* | 8/2017 | Graham | G06F 16/24542 |
| 2010/0121839 A1* | 5/2010 | Meyer | G06F 16/972 707/769 |

(Continued)

*Primary Examiner* — Christopher J Raab
(74) *Attorney, Agent, or Firm* — Gilliam IP PLLC

(57) ABSTRACT

Dynamic partitioning of a search space of queries is implemented for flexible, heuristic database querying. Search space partitioning refers to dividing the search space for a submitted query into smaller parts by augmenting the queries to append thereto an additional predicate comprising a dynamic partition key and a value(s) selected based on heuristics (e.g., recency and/or relevancy of the value(s)). A plurality of candidate augmentations of the query and corresponding query plans are generated and evaluated based on additional heuristics to determine which can be executed to yield the best results in terms of result quality and latency. This query plan is selected and executed for retrieval of results that satisfy the query, with pagination utilized for presentation of the results. The procedure of generating candidate query plans, selecting one of the candidates for execution, and paginating results is repeated until a search termination criterion is satisfied.

20 Claims, 7 Drawing Sheets

(56) References Cited

U.S. PATENT DOCUMENTS

| | | | | |
|---|---|---|---|---|
| 2010/0281013 A1* | 11/2010 | Graefe | ................ | G06F 16/2246 |
| | | | | 707/715 |
| 2016/0335274 A1* | 11/2016 | Vadapandeshwara | ....................... | |
| | | | | G06F 16/86 |
| 2017/0039232 A1* | 2/2017 | Jayanth | ............. | G06F 16/24568 |
| 2019/0197163 A1* | 6/2019 | Morris | .............. | G06F 16/24545 |
| 2020/0134081 A1* | 4/2020 | Ho | ........................ | G06F 16/252 |

\* cited by examiner

HEURISTIC DATABASE QUERYING WITH DYNAMIC PARTITIONING

BACKGROUND

The disclosure generally relates to digital data processing (e.g., CPC class G06F) and to information retrieval, database structures therefor, and file system structures therefor (e.g., CPC subclass G06F 16/00).

Resources of a cloud service provider (CSP) or Software-as-a-Service (SaaS) application provider can be represented with structured data for consumption by third party services, such as security providers. When resources of the CSP or SaaS application provider are represented in this manner, third party services are able to retrieve the structured data representing the resources provisioned to a particular end user (e.g., an account or group of accounts under the same tenant) to perform analysis or monitoring of the resources for the end user. Generally, CSPs and SaaS application providers expose an application programming interface (API) that can be invoked for retrieval of the structured data. Analysis or monitoring of cloud or SaaS application resources is commonly implemented through querying the collection of structured data representing the resources that the third party service has obtained from the CSP or SaaS application provider via the corresponding API.

BRIEF DESCRIPTION OF THE DRAWINGS

Aspects of the disclosure may be better understood by referencing the accompanying drawings.

DESCRIPTION

Figure 1:
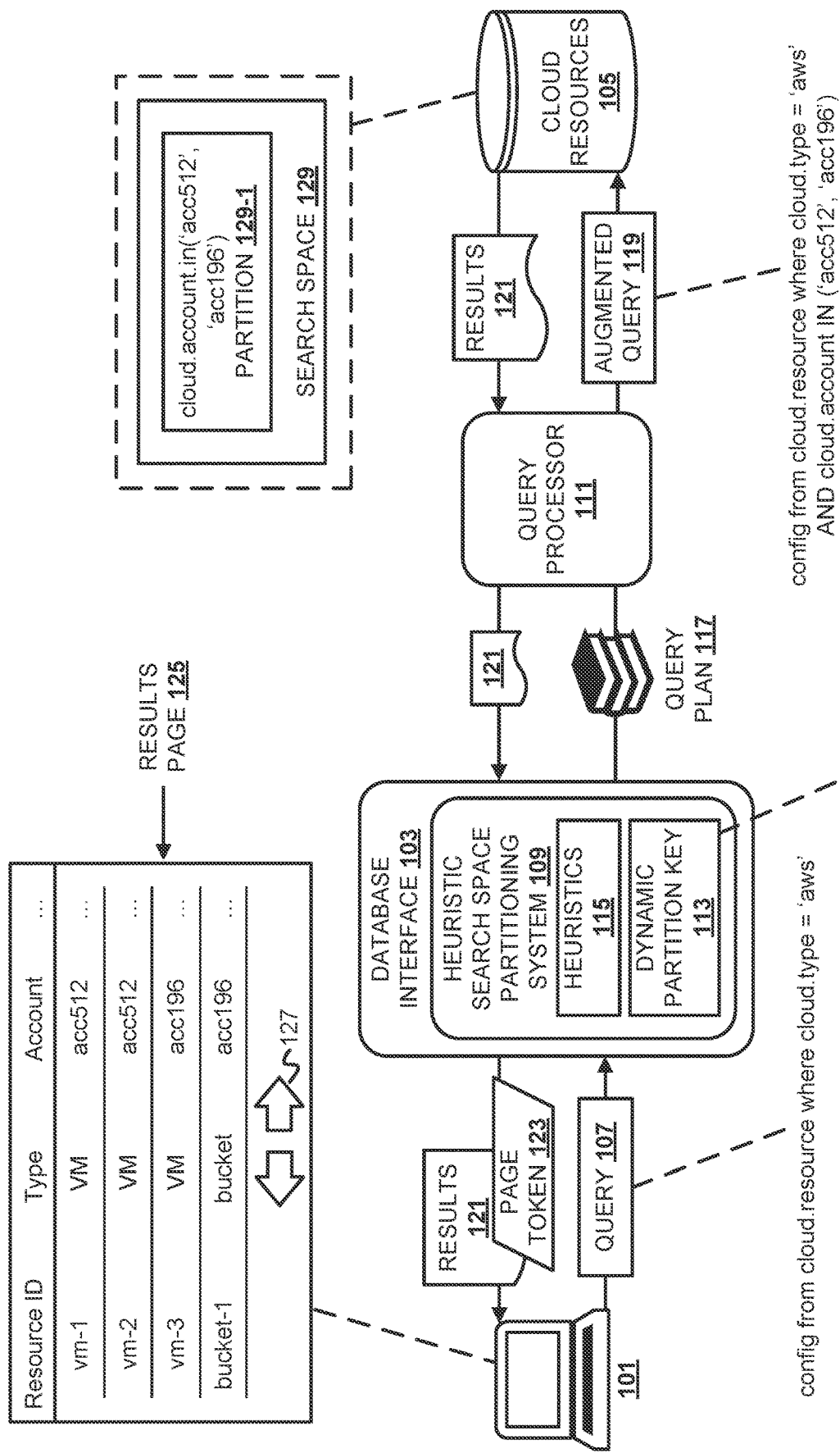
FIG. 1 is a conceptual diagram of heuristic query processing to partition a search space and utilizing pagination for returned results.

The description that follows includes example systems, methods, techniques, and program flows that embody aspects of the disclosure. However, it is understood that this disclosure may be practiced without these specific details. For instance, this disclosure refers to database management and query evaluation using Structured Query Language (SQL) in illustrative examples. Aspects of this disclosure can be also applied to other database management languages, including languages that leverage wrappers for another database management language. In other instances, well-known instruction instances, protocols, structures and techniques have not been shown in detail in order not to obfuscate the description.

Terminology

This description uses shorthand terms related to cloud technology for efficiency and ease of explanation. When referring to "a cloud," this description is referring to the resources of a CSP. For instance, a cloud can encompass the servers, virtual machines, and storage devices of a CSP. In more general terms, a CSP resource accessible to customers is a resource owned/managed by the CSP entity that is accessible via network connections. Often, the access is in accordance with an API or software development kit provided by the cloud service provider.

This description uses shorthand terms related to the SaaS delivery model for efficiency and ease of explanation. A "SaaS application" refers to an application hosted in the cloud and made available to end users over the Internet. When referring to a "SaaS application resource," this description is referring to the resources of a vendor of a SaaS application. In general terms, a SaaS application resource accessible to customers is a resource owned or managed by the SaaS application vendor that is accessible via network connections. Often, the access is in accordance with an API provided by the SaaS application vendor.

This description uses the term "database" to refer to a generic datastore. Types of generic datastores to which "a database" can refer encompass but are not limited to relational databases, including those maintained and managed using SQL. The term database can also encompass NoSQL databases, columnar databases, and other datastores logically structured according to non-relational database models.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Cloud resources and SaaS application resources (collectively "resources") are generally stored in databases managed by the vendor (i.e., the CSP or SaaS application provider). Resources that the vendor has allocated or provisioned to an end user (i.e., a user or group of users having an account with the vendor) can be queried for, and results of queries submitted to the vendor's databases comprise representative data of the resources that satisfy the queries. Due to the potential for vast quantities of resources across accounts with the vendor that have been provisioned to the end user, query optimization can be leveraged to optimize queries submitted to databases for retrieval of resource data for increased efficiency of data retrieval and reduced wait times for end users. However, many query optimization techniques are inflexible due to lack of applicability to different database types.

Disclosed herein are techniques for flexible, heuristic query generation to improve performance without changing design factors of the resource database being queried, including the database schema, index(es), and physical aspects that are affected by conventional database optimization techniques. Rather than modifying the distribution of stored data across database structures (e.g., tables) and/or servers, the search space for submitted queries that corresponds to the database is dynamically partitioned into a plurality of smaller subspaces. Unlike conventional database partitioning, however, search space partitioning as described herein is performed dynamically as queries are submitted by augmenting the submitted queries without altering the database itself, resulting in a more flexible approach to partitioning for reducing latencies associated with database querying. A query can be augmented by appending one or more designated "dynamic partitioning keys" and corresponding value(s) thereto, where the one or more values of the key are selected based on various heuristics. The heuristics are independent of the database structure, so query optimization can be extended across database types and designs. This improves search performance as with horizontal partitioning and sharding but through dynamic modifications to submitted queries instead of physical changes to the database.

When configuring a system for heuristic query processing, at least one dynamic partition key is designated that can be appended to queries submitted to the resource database. An example of such a dynamic partition key is an account key, which can have a name/identifier of an account with the vendor as a value. At runtime, the system obtains a query submitted to the database and generates a plurality of candidates augmented versions of the query, where each of the candidates comprises a version of the submitted query having the dynamic partition key and one or more values appended thereto. The value(s) of the dynamic partition key define a partition of the search space, or the subset of data stored in the database on which the query will effectively be executed. To generate a candidate augmented version of the query, the system selects a set of one or more candidate values of the dynamic partition key based on a set of heuristics. Examples of selecting candidate values based on the heuristics include selecting the values determined to be most recently accessed (e.g., due to updating data/metadata associated with the value) and/or relevant in terms of counts of active resources associated with the value. The system generates candidate query plans that correspond to the candidate augmentations of the query and evaluates the candidate query plans based on additional heuristics to determine which should be executed on the database. This candidate query plan is selected and executed for retrieval of results that satisfy the query.

The system leverages pagination for displaying the results and, using page tokens, maintains state to allow users to navigate between pages of results were retrieved for corresponding partitions of the search space. When a user reaches the end of the pages of retrieved results and requests the next page, the communication of the request and page token to the system triggers the system to determine another augmented version of the query and corresponding query plan that uses different, unsearched candidate values of the appended partition key based on the heuristics and execute the query plan to retrieve the next batch of results satisfying the query. The system can repeat this approach until the user has completed navigating the results or it determines that there are no more resources satisfying the query that can be returned and the query is thus fulfilled.

Example Illustrations

FIG. 1 is a conceptual diagram of heuristic query processing to partition a search space and utilizing pagination for returned results. A client 101 accesses a database 105 of cloud resources via a database interface 103. The database 105 stores data of cloud resources that have been provisioned/allocated to the client 101 by a CSP. Data of cloud resources may have been previously inserted into the database 105 by a security provider during a resource ingestion process. A query processor 111 processes queries submitted to the database interface 103 by the client 101 and executes the queries on the database 105. The query processor 111 may be implemented as part of the database interface 103 or may be implemented separately from the database interface 103 as is depicted in FIG. 1. For instance, the query processor 111 may be implemented separately from the database interface 103 for cases in which the query language used by the query processor 111 for querying the database 105 differs from that used by an end user of the database interface 103 (e.g., a user of the client 101) for writing queries. As an example, the query processor 111 may use SQL for managing/querying the database 105, while the client 101 submits queries in another language that is converted to or rewritten with SQL through the use of SQL templates, a SQL wrapper, etc. by the database interface 103.

The database interface 103 comprises a heuristic search space partitioning system ("system") 109. The system 109 processes queries submitted to the database interface 103 that satisfy certain criteria to partition a search space of such queries (i.e., the search space corresponding to the database 105). While this example depicts the database 105 as storing cloud resources, in implementations, the system 109 can be employed for querying databases storing resources of other vendors of cloud computing or cloud-based technology, such as SaaS application providers.

FIG. 1 depicts such a query 107 that the client 101 submits to the database interface 103. The database interface 103 may obtain the query 107 from a query interface exposed to the client 101 for writing queries or as a result of an invocation(s) of an API exposed by the database interface 103 that provides the client 101 with a query interface. As an illustrative example, the query 107 is represented in FIG. 1 as follows:

config from cloud.resource where cloud.type='aws'

According to this example, the query 107 is a query for retrieving data of cloud resources that have been provisioned to an end user with which the client 101 is associated by Amazon Web Services® (AWS). FIG. 1 depicts a search space 129 of the query 107 as the database 105. Thus, the query 107 as written will execute over the search space 129, which corresponds to the database 105 as a whole, to search for resources that satisfy the query 107. FIG. 1 will refer to the search space 129 as being partitioned rather than the database 105 itself to highlight that the partitioning is logical and does not entail or result in any changes the database 105.

The system 109 obtains the query 107 via the database interface 103 and determines whether the search space 129 associated with the query 107 should be partitioned before executing the query 107. To make this determination, the system 109 at least determines whether the query 107 already indicates a dynamic partition key ("key") 113 that has been predetermined. The key 113 designates one or more fields of data stored in the database 105 that can be queried and by which the search space 129 can be divided into sub-spaces corresponding to the value(s) of the key 113. In this example, the key 113 is defined as the "cloud.account" data field, which is a data field storing a name or identifier of the cloud account with which a cloud resource documented in the database 105 is associated. The system 109 determines that the query 107 does not already indicate the key 113 and the search space 129 should thus be partitioned.

The system 109 determines a first partition of the search space 129 based on heuristics 115 with which it has been configured. The heuristics 115 guide selection of values of the key 113 to append to submitted queries. The system 109 has been preconfigured to select N values of the key 113 for each partition, where N is an integer greater than 0 (e.g., ten values of the key 113 per partition). The value of N may be a value informed by prior experimentation and/or expert knowledge that is determined to produce sufficiently informative results without incurring excess latencies. As an exemplary heuristic, the heuristics 115 may indicate that values of the key 113 that will yield the most recent results should be prioritized for selection. For the "cloud. account" key, the values corresponding to the most recent results may be the names/identifiers of the accounts of the end user associated with the most recent updates (e.g., in terms of ingestion of resource data for storage in the database 105). Another example of one of the heuristics 115 is a heuristic indicating that the values that will yield the most relevant results should be prioritized for selection. For the "cloud-.account" key, relevance can be defined in terms of resource counts for an account per cloud service or API name. For instance, accounts may have differing quantities of resources documented for different cloud services having respective APIs. Counts of resources per cloud service/API can be evaluated to prioritize selection of accounts having greater amounts of resources corresponding to a cloud service or API and therefore more resources that are relevant to the submitted query.

Figure 2:
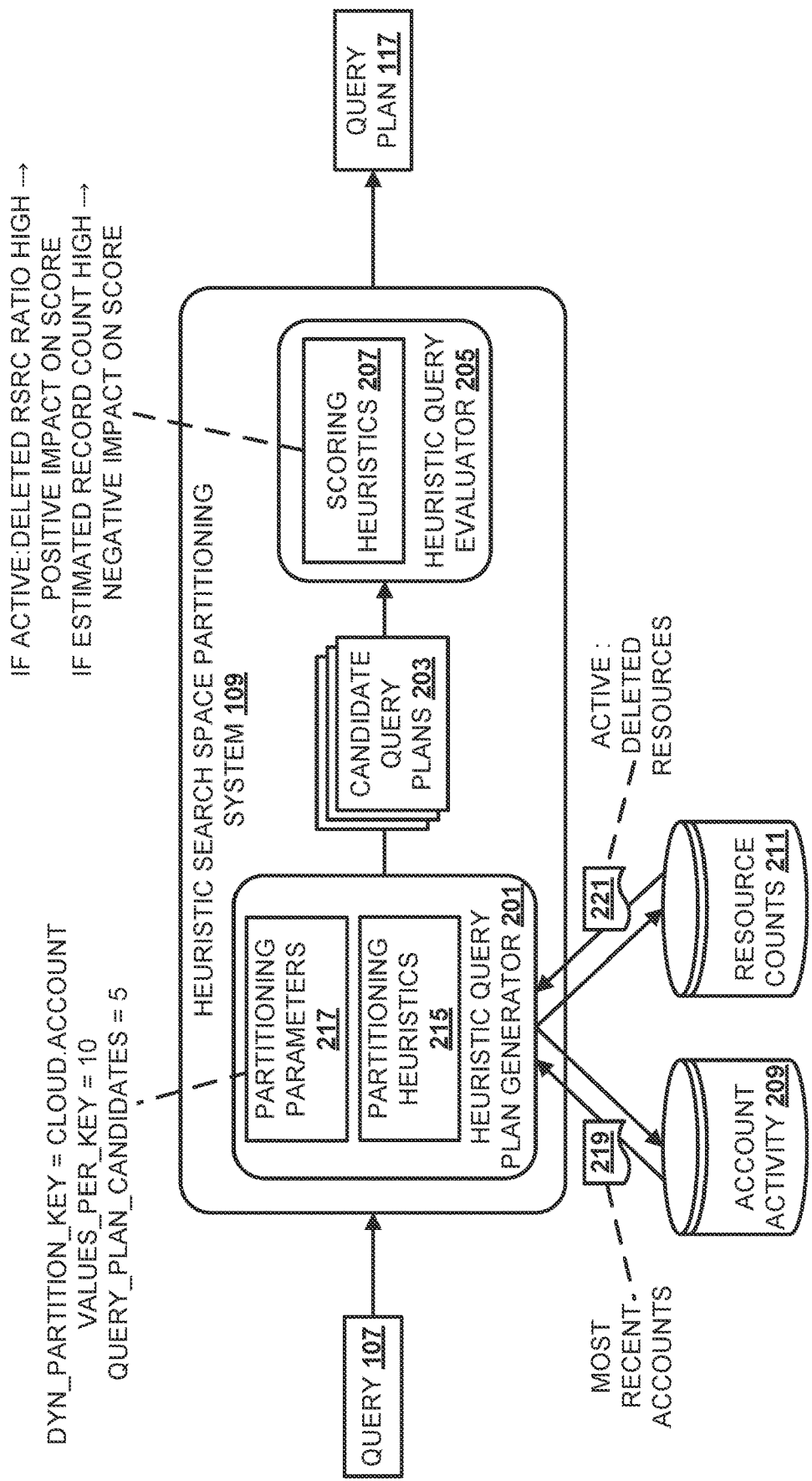
FIG. 2 is a conceptual diagram that depicts augmenting submitted queries heuristic database querying in additional detail.

As is described in further detail in reference to FIG. 2, the system 109 generates a set of candidate query plans for different augmented versions of the query 107. Each of the augmented versions of the query 107 comprises the query 107 and an additional clause or predicate that has been appended thereto, where the additional clause or predicate comprises the key 113 and N values that the system 109 has selected based on the heuristics 115. Referring to the exemplary heuristics above, each of the augmented versions of the query 107 can comprise N of the most recent and/or relevant account identifiers/names based on updates to the accounts and resource counts across cloud services or APIs. To illustrate, each of the modifications of the query 107 may have the following general format:

config from cloud.resource where cloud.type='aws' and cloud. account in (set of N accounts selected based on heuristics 115)

The system 109 determines which of the candidate query plans and corresponding augmented version of the query 107 should be selected for execution based on evaluating the candidates in view of additional ones of the heuristics 115. The candidate query plan and corresponding query modification selected by the system 109 is that which is expected to have a lower latency when executed while still yielding a sufficiently sized results set. The system 109 selects a query plan 117 that corresponds to an augmented query 119 for a partitioned search space among the candidates and indicates the query plan 117 to the query processor 111 for execution. The augmented query 119 is a version of the query 107 augmented with an additional predicate that comprises the key 113 and N values selected based on the heuristics 115. In this example, the augmented query 119 comprises two values of the key 113—"acc512" and "acc196"—that are appended to the query 107 with an "AND" condition to effectively search a partition 129-1 of the search space 129 for resources in the partition 129-1 (i.e., resources where the value of the "cloud.account" field is "acc512" or "acc196") that satisfy the query 107. The query processor 111 executes the augmented query 119 for which the query plan 117 was generated on the database 105. The query processor 111 can execute the augmented query 119 on the database 105 according to the steps that were outlined in the query plan 117.

The query processor 111 obtains results 121 of the augmented query 119 that it provides to the system 109. The results 121 comprise data of the resources that satisfied the query 107 that correspond to the partition 129-1 of the search space 129. The system 109 utilizes pagination for returning results to the client 101 such that results of the query 107 are presented to a user of the client 101 with pages (e.g., as opposed to in a single, scrollable list). The system 109 includes a page token 123 with the results 121 that are returned to the client. The page token 123 corresponds to the partition 129-1 (e.g., by comprising the values of the key 113 corresponding to the partition 129-1) and facilitates maintenance of state between partitioning events as the client 101 or user thereof navigates between pages of results. The system 109 utilizes page tokens such as the page token 123 to carry information indicative of the partition key values that have been searched between the system 109 and the client 101. The system 109 can thus track the values that have been searched via the page tokens to prevent selection of those values during subsequent partitioning events, which would result in revisiting partitions of the search space 129. The system 109 can track page tokens that have been sent to the client 101 to track the selected values of the key 113 in effect. The client 101 thus renders at least a first results page 125 comprising the results 121 corresponding to a first partition of the search space 129 of the query 107. The results 121 can thus be viewed and evaluated via the results page 125.

Since the results 121 correspond to the partition 129-1 of the greater search space 129, the results 121 may be a subset of the possible results of the query 107. Additional resources that satisfy the query 107 may exist yet correspond to other, yet-unsearched partitions of the search space 129. To continue querying the search space 129 for additional resources not within the partition 129-1 that satisfy the query 107, a graphical user interface (GUI) element 127 of the results page 125 can be selected to trigger a request for additional results. When the GUI element 127 is selected (e.g., by a user of the client 101), the request for additional results and the page token 123 are communicated from the client 101 to the system 109. Receipt of the request and page token 123 triggers determination of another partition of the search space 129 over which to execute the query 107 through generation of additional candidate query plans and corresponding augmented versions of the query 107. When generating the subsequent candidate query plans and corresponding versions of the query 107, because the page token 123 received with the request is indicative of the previously-selected values to the system 109, the system 109 should select different values of the key 113 than those previously selected ("acc512" and "acc196" in this example) so that the there is no overlap between searched partitions of the search space 129.

As additional requests for additional results and page tokens are communicated by the client 101 to the system 109, the system 109 can repeat this procedure for partitioning of the search space 129 for execution of the query 107 on different partitions to build the results set for the query 107 until a termination criterion has been satisfied. The termination criterion may be satisfied if each possible value of the key 113 has been selected, if a threshold number of modifications of the query 107 have been generated that do not yield any results comprising resources that satisfy the query 107, and/or if a communication session established by the client 101 has been terminated, for example.

FIG. 2 is a conceptual diagram that depicts augmenting submitted queries for heuristic database querying in additional detail. FIG. 2 depicts the generation of candidate query plans and selection of the "best" candidate for execution based on heuristics performed by the system 109. The system 109 is depicted as comprising a heuristic query plan generator ("query plan generator") 201 and a heuristic query evaluator ("query evaluator") 205. The heuristics 115 of FIG. 1 are depicted in further detail as comprising two sets of heuristics: partitioning heuristics 215 that are used by the query plan generator 201 and scoring heuristics 207 that are used by the query evaluator 205. FIG. 2 continues reference to the database 105 of FIG. 1.

The query plan generator 201 is configurable with partitioning parameters 217, the values of which inform how a search space should be partitioned and how many candidate partitions of the search space should be generated. The partitioning parameters 217 include the dynamic partition key used for dynamic search space partitioning that corresponds to the key 113 of FIG. 1, the number of candidate query plans to generate, and the number of candidate values to be selected per key for each candidate query plan. In this example, the partitioning parameters 217 designate that the "cloud.account" data field is the dynamic partition key, five candidate query plans should be generated during each partitioning event, and that ten values of the "cloud.account" dynamic partition key should be selected for generating each candidate query plan.

When the system 109 obtains the query 107, the query plan generator 201 generates a set of candidate query plans 203 based on the partitioning heuristics 215. The partitioning heuristics 215 comprise heuristics that guide the query plan generator 201 in determining the values of the dynamic partition key to select for generating each candidate query plan, which includes augmenting the query 107 with a predicate that comprises the dynamic partition key and the selected values. Each of the partitioning heuristics 215 can be implemented with a threshold, with one or more ranges of values, with a rule comprising one or more criteria, etc.

An example one of the partitioning heuristics 215 is a heuristic indicating that values of the dynamic partition key corresponding to the most recent or current resources should be prioritized for selection. These values encompass those associated with the most recent updates to the database 105. With respect to the account partition key, the values that correspond to the most recent or current resources and thus will provide the most recent or current results can be the names/identifiers of accounts associated with the most recent updates to the database 105 (e.g., resulting from creating or updating resources allocated to the account). The query plan generator 201 obtains account recency data 219 that reflects which accounts have been most recently updated. The query plan generator 201 can obtain these data from a database 209 or other storage (e.g., log storage) in which account updates and other activities are recorded/stored. For instance, the query plan generator 201 can query the database 209 for the accounts updated in the past week ranked by recency of the update and retrieve the account recency data 219 in response.

Alternatively, or in addition, the partitioning heuristics 215 can indicate that values of the dynamic partition key associated with a greater ratio of (or other quantitative relation between) active resources and deleted resources should be prioritized for selection. Deleted resources are those that have been deleted for the corresponding account but have not yet been expunged or purged from the database 105. For example, consider a first account having 250 active resources and 450 deleted resources documented compared to a second account having 200 active resources and 100,000 deleted resources documented. Based on this heuristic, the query plan generator 201 will prioritize the first account for selection because the ratio of active to deleted resources is greater than that corresponding to the second account. The system 109 may have previously determined counts of active and deleted resources that are maintained in the database 105 in association with each value in the domain of values for the dynamic partition key (e.g., the active and deleted resources associated with each account) and stored the resource counts per value of the dynamic partition key in a database 211. The query plan generator 201 queries the database 211 for at least a subset of the resource counts and obtains resource count data 221 in response. The query that the query plan generator 201 submits to the database 211 may comprise a request for the ratio or other quantitative relation between the retrieved resource counts. In such cases, the resource count data 221 comprise the ratios determined for each value of the dynamic partition key (e.g., for each account) when executing the query on the database 211.

Another example of one of the partitioning heuristics 215 that can be implemented is a heuristic for selecting values of the dynamic partition key that correspond to the most relevant resources. In the context of the "cloud.account" key, these accounts are those that have been allocated greater quantities of resources that can be searched when executing the query and thus will produce more relevant results. The quantities of resources allocated to an account that can be searched can encompass the collective set of resources associated with an account or a subset of the resources that are associated with a particular service and/or API. Counts of resources per account per API or cloud service may have been predetermined and made accessible to the query plan generator 201 or can be determined by the query plan generator 201 at runtime through execution of an additional, simple query(ies) on the database.

To illustrate, consider the following exemplary query:
config from cloud.resource where cloud.type='aws'
For this exemplary query, prioritizing accounts having greater counts of resources per API/cloud service across APIs/cloud services can minimize the number of empty results sets from executing the query on a partition of the search space and thus maximize relevance of the results. This may be the case when accounts have been onboarded and thus have a known name/identifier that is in the domain of values of the dynamic partition key but have not yet had resources ingested into the database 105.

As another example, the following exemplary query searches for security group resources:
config from cloud.resource where api.name='aws-ec2-describe-security-groups'
This exemplary query specifies the API name "aws-ec2-describe-security-groups" for AWS clouds. When determining account names/identifiers with which to augment this query based on the recency and relevancy heuristics, the query plan generator 201 can prioritize those of the more recent accounts represented in the account recency data 219 that have greater counts of resources associated with this API and are thus more relevant to the query.

As a final example, the following query comprises a join for evaluating security groups:
config from cloud.resource where api.name='aws-ec2-describe-security-groups' as X;

config from cloud.resource where api.name='aws-ec2-describe-instances' as Y; filter '$. X.ipPermissions[*].ipRanges[*] contains 0.0.0.0/0 and $. Y.securityGroups[*] contains $. X.groupId'; show X;

When heuristically selecting account names/identifiers for this query based on relevancy, the query plan generator 201 will prioritize accounts that have resources corresponding to both APIs named in the query (i.e., 'aws-ec2-describe-security-groups' and 'aws-ec2-describe-instances').

The system 109 may generate a set of candidate values of the dynamic partition key before selecting values for inclusion in an augmentation to the query 107. For instance, the system 109 may select a set of candidate values that is greater than the count of values that will be appended to queries (e.g., 20 candidate values where 10 values are to be appended to queries) and select values for inclusion in the query from this set of candidate values. The set of candidate values can comprise M values that are determined to be the best candidates based on the partitioning heuristics 215. As an example, the system 109 can cross-reference the account recency data 219 with the resource count data 221 to determine a set of M account names/identifiers having a best combination of account recency and ratio of active to deleted resources as determined from evaluation based on the partitioning heuristics 215. Selection from this set of candidate values to determine each set of values of the dynamic partition key for augmenting the query 107 can be random or based on a selection algorithm (e.g., round robin). For instance, for each of the candidate query plans 203, the query plan generator 201 can select ten of the accounts indicated in the account recency data 219 ranked by recency in a round robin ordering that may be further informed by whether the corresponding ones of the ratios determined from the resource count data 221 satisfy a criterion. As another example, the partitioning heuristics 215 may be associated with ranks, priorities, etc. that inform selection of values by the query plan generator 201. To illustrate, if the partitioning heuristics 215 indicate prioritization of recency over the ratio of active to deleted resources, the query plan generator 201 can prioritize accounts represented in the account recency data 219 over those that may be less recent but have higher ratios of active to deleted resources represented in the resource count data 221.

To generate each of the candidate query plans 203 in this example, the query plan generator 201 selects a set of ten names/identifiers of accounts based on the partitioning heuristics 215, appends a predicate comprising the dynamic partitioning key and the ten selected account names/identifiers to the query 107, and generates a plan for execution of the resulting augmented version of the query 107. The query plan generator 201 can generate each of the candidate query plans 203 by invoking functionality offered for the programming language used for executing queries on the database 105. For instance, in SQL, the query plan generator 201 can add an "EXPLAIN" keyword to the front of each candidate augmentation of the query 107 and execute the resulting statement to generate a corresponding one of the candidate query plans 203. Each of the candidate query plans 203 that results indicates a sequence of steps to be performed when executing the corresponding augmentation of the query 107 and a value(s) of an execution metric(s) that at least comprises an estimated number of records (e.g., rows) to be examined if the plan is executed. The query plan generator 201 may invoke additional functionality offered for the query language to obtain additional execution metric values for the generated plan. Additional examples of execution metrics include execution cost and estimated execution time, though execution metrics can vary among programming languages and query processors.

The query evaluator 205 evaluates the candidate query plans 203 based on the scoring heuristics 207 to determine which has a best heuristic score. The best heuristic score is determined relative to the scores of each of the candidate query plans 203. Although heuristics for evaluating and scoring a candidate query plan can vary among implementations, in this example, the scoring heuristics 207 guide the query evaluator 205 in scoring each of the candidate query plans 203 based on a ratio of active and deleted resources associated with the cloud accounts specified for the plan and the estimated number of records that will be examined if the plan is executed. According to the scoring heuristics 207, a candidate query plan's score should be positively impacted if the ratio of active resources to deleted resources associated with the cloud accounts to be queried is higher. The scoring heuristics 207 also indicate that a candidate's score should be negatively impacted if the estimated number of records to be examined when executing the plan is greater and thus will incur greater latencies. Each of the scoring heuristics 207 can be implemented with a threshold, where a candidate query plan is scored based on whether a corresponding value (e.g., execution metric or ratio of active and deleted resources) exceeds or is below the threshold; with one or more ranges of values, where a candidate query plan is scored based on the range into which a corresponding value falls; or with another one or more criteria.

The query evaluator 205 can determine a score for each of the candidate query plans 203 by evaluating the associated resource ratios, which the system 109 may have cached following retrieval from the database 211, and estimated record count and accumulating scores based on corresponding ones of the scoring heuristics 207. As another example, the query evaluator 205 can determine the score for a candidate query plan by assigning the candidate query plan a default score (e.g., a default score of five) and adjusting the default score based on evaluation of the estimated record count and resource ratios in view of the scoring heuristics 207, such as by increasing or decreasing the score accordingly. The query evaluator 205 selects the one of the candidate query plans 203 having the best score resulting from the heuristic scoring, which is the query plan 117 in this example, and indicates this query plan for execution. The query plan 117 is thus determined to be the optimal query plan among the candidate query plans 203.

FIGS. 3-6 are example operations for heuristic search space partitioning and pagination of query results. The example operations are described with reference to a heuristic search space partitioning system (hereinafter "the system") for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
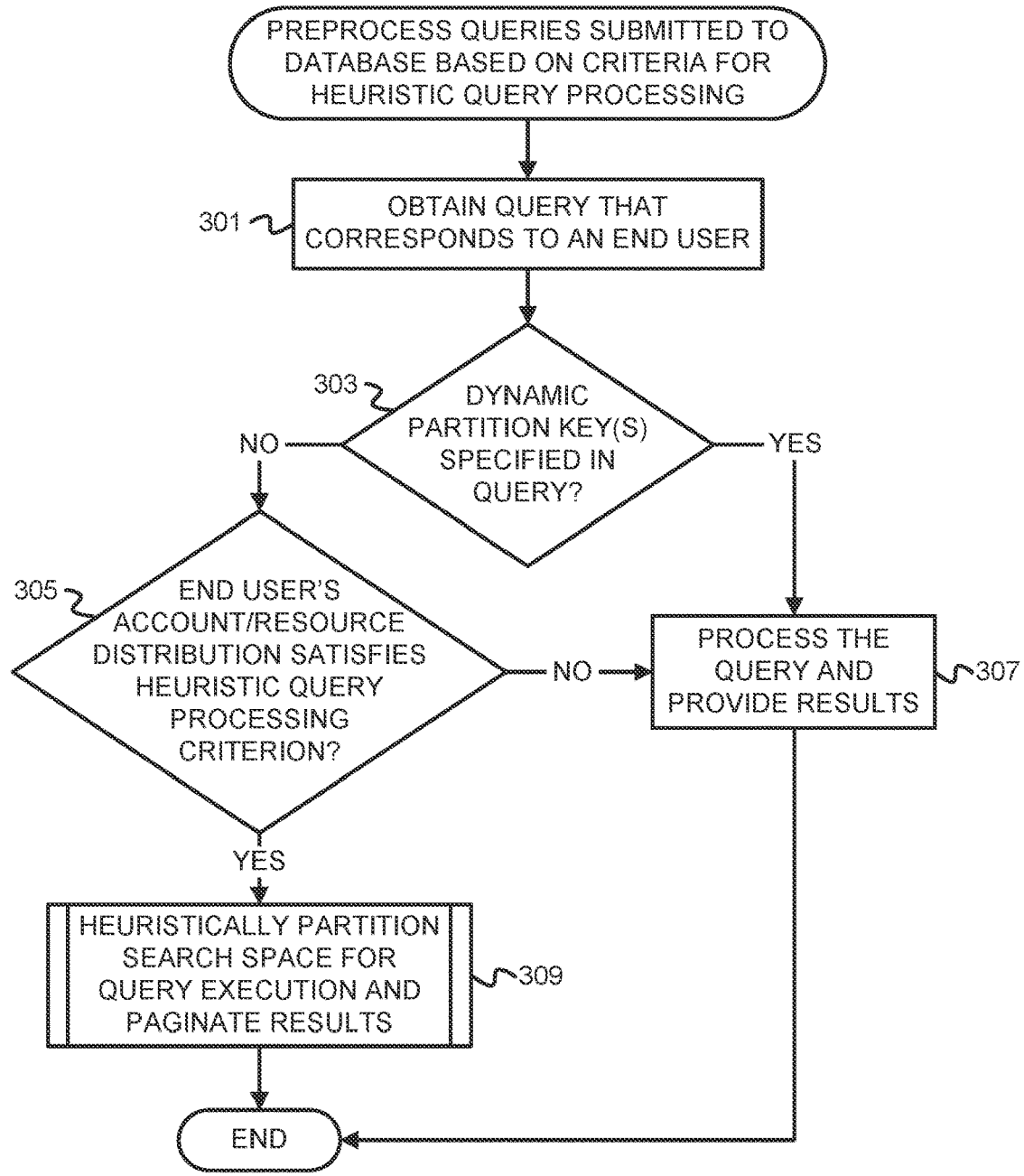
FIG. 3 is a flowchart of example operations for preprocessing queries submitted to a database based on criteria for heuristic query processing.

FIG. 3 is a flowchart of example operations for preprocessing queries submitted to a database based on criteria for heuristic query processing. Before executing a query on the database, the system determines whether the query satisfies one or more criteria for heuristic search space partitioning. As described above, search space partitioning refers to dividing a search space into subspaces and executing a query on each of the subspaces to achieve dynamic, logical partitioning of the underlying database. The example operations refer to a database managed by a vendor that stores data of resources provisioned or allocated to end users by the vendor. Examples include a cloud database that stores data describing cloud resources provisioned to end users of the CSP and a database that stores data describing resources of a SaaS application allocated to end users of the SaaS application.

At block 301, the system obtains a query that corresponds to an end user. The end user may be a user or group of users associated with an organization, for example. The system obtains the query that has been submitted from or generated by a client for execution over the database. If the query language used by the submitter of the query is different from the language used for managing the database, the query may be "transformed" into a corresponding representation that is compatible for execution over the database. Alternatively, or in addition, query templates can be used to represent an approximate query structure, where the predicates, key/value pairs, etc. included in the query templates are those generally included in submitted queries, but the values are provided by the client. For instance, the query may be formatted according to a query template used for transforming client-submitted queries into equivalent queries in the database querying language (e.g., with SQL templates).

At block 303, the system determines whether a dynamic partition key(s) is specified in the query. The system has been configured with at least a first dynamic partition key that corresponds to a data field(s) of data stored in the database by which the data can be queried. The partition key is considered a dynamic partition key because it facilitates dynamic partitioning of a search space corresponding to the database, or determining subsets of the search space corresponding to subsets of the data maintained in the database. The system determines if the query comprises a predicate or clause that includes the dynamic partition key and one or more specified values. If the dynamic partition key(s) is specified in the query, operations continue at block 307, where the system processes the query and provides results that are returned from executing the query. Otherwise, if the dynamic partition key(s) is not specified, operations continue at block 305.

At block 305, the system determines if the end user's account and resource distribution satisfy a criterion for heuristic query processing. Counts of resources that the vendor has provisioned or allocated to each account associated with the end user have been predetermined and are maintained in storage that is accessible to the system (e.g., a database maintained by an external server). The system evaluates the distribution of resources across accounts based on the criterion to determine if heuristic query processing should be invoked. The criterion may be represented as a threshold(s) number(s) of accounts and/or resources associated with the end user or another metric(s) based on which the end user's account and resource distribution can be evaluated. Generally, the system may determine that heuristic query processing should be invoked if the end user has a large quantity of resources distributed across a large quantity of accounts such that large latencies may be incurred when querying the database. If the criterion is not satisfied for the end user, operations continue at block 307, where the system processes the query and provides results that are returned from executing the query on the database. If the criterion is satisfied, operations continue at block 309.

At block 309, the query heuristically partitions the search space for query execution and paginates the results. Example operations for heuristic search space partitioning and pagination of results are given in FIG. 4, which is a flowchart of example operations for heuristically partitioning a search space for query execution and paginating results.

Figure 4:
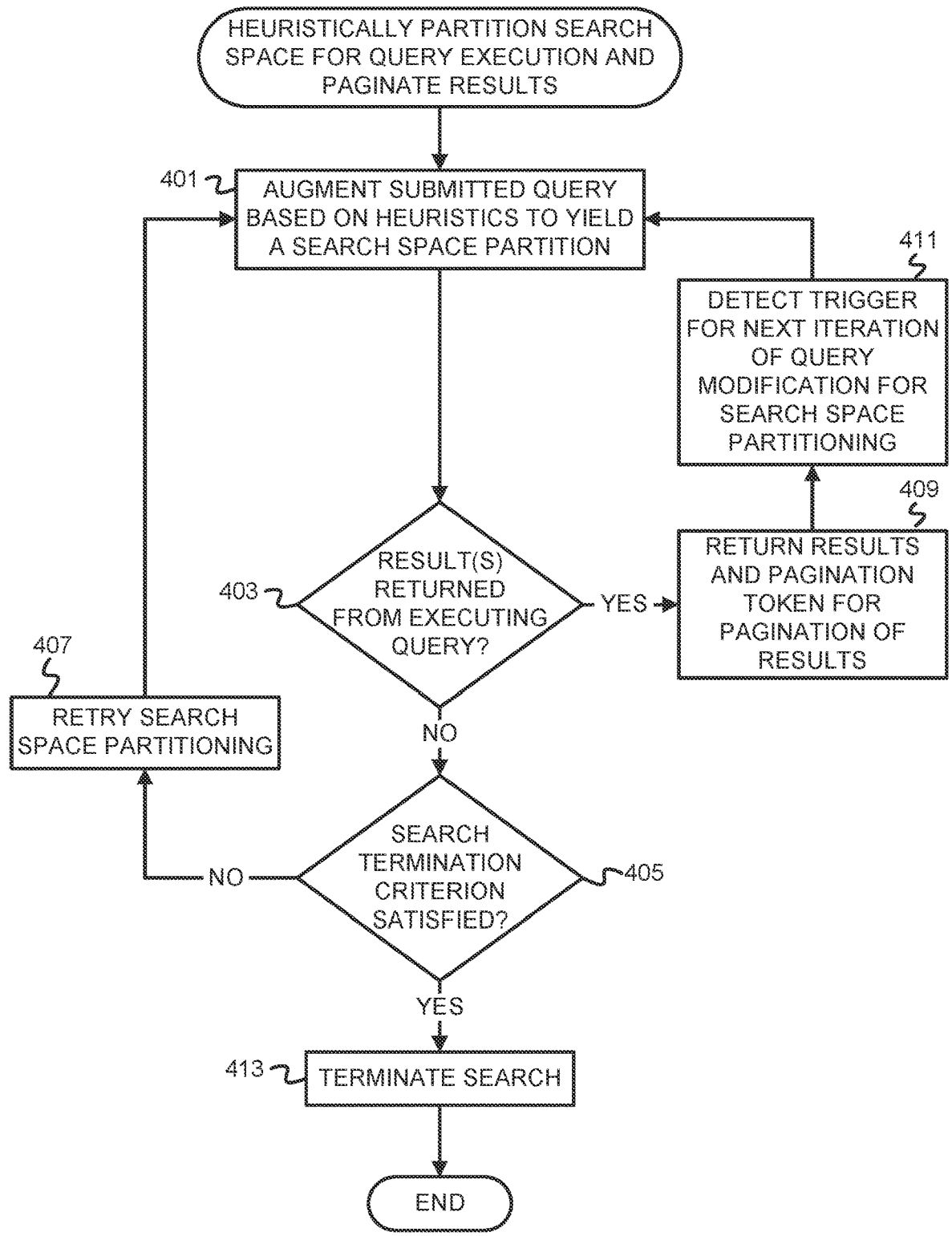
FIG. 4 is a flowchart of example operations for heuristically partitioning a search space for query execution and paginating results.

With reference to FIG. 4, at block 401, the system augments the submitted query based on a set of heuristics to yield a partition of the search space. The system determines a plurality of augmentations to the submitted query as candidates for execution, where each of the candidate augmentations to the query comprises a version of the query that has been augmented with an additional predicate or clause that specifies the search space partition key and N values of the key that the system selects based on the heuristics. The heuristics may indicate that the values that will yield the most recent results, the most relevant results, or the greatest proportion of active resources relative to deleted resources should be prioritized for selection. Each of the candidate augmented queries comprises a different set of selected values of the key, none of which have been included in previously executed queries. The system determines which of the candidate augmented queries will yield the best results based on additional heuristics and selects this augmented query for execution. Augmentation of queries for search space partitioning is described in further detail in reference to FIG. 5.

At block 403, the system determines whether one or more results were returned from executing the query. Any results that are returned comprise data of the resources corresponding to the partition of the search space that satisfied the query. If no results are returned, none of the resources corresponding to the search space partition satisfied the query, and operations continue at block 405. If one or more results are returned, operations continue at block 409.

At block 405, the system determines if a search termination criterion is satisfied. The system maintains one or more criteria for terminating the search for resources satisfying the query based on search space partitioning. An example search space criterion is a maximum number of consecutive retries of search space partitioning that do not produce any results. As an example, a threshold of 100 consecutive retries may be set, where the search is to be terminated if 100 consecutive retries have been performed without yielding any additional results. Satisfaction of this criterion is indicative that there are no unsearched records remaining that satisfy the query and the result set is likely complete. Another example is a criterion that each value of the set of possible values of the search space partition key has been selected for inclusion in an augmented query and there are no potential results remaining since the search space has been traversed in whole. Another search termination criterion may indicate that the search should be terminated if the client's session is terminated. If no criterion is satisfied, operations continue at block 407. If at least a first of the criteria for terminating the search have been satisfied, operations continue at block 413, where the system terminates the search and may indicate to the client that the search is completed.

At block 407, the system initiates a retry of search space partitioning. To retry partitioning of the search space, the system selects a different set of yet-unsearched values of the search space partition key for execution of the query over a corresponding partition of the search space. The system can maintain a counter indicating a number of retries that have been performed and increment the counter as part of initiating the retry. The system may also modify the number of values of the search space partition key that are to be selected, thus expanding the scope of the search to increase the chances of retrieving results. Modification of the number N of values of the search space partition key to be selected may be performed if the number of partitions searched for a submitted query is less than a threshold (e.g., five partitions or less have been determined). Examples of how the system may modify the value of N include multiplying N by a predetermined factor (e.g., multiplying a value of N of 10 by a factor of two to double N), increasing N by a preconfigured value, etc. Operations continue at block 401 where a new augmentation of the query is generated.

At block 409, the system returns the results and a pagination token for pagination of the results. For returning results to the client, the system utilizes pagination with pagination tokens, sometimes referred to as cursors, so that the batches of results corresponding to each search space partition can be presented with lower latencies per page rather than returning a high volume, scrollable list of all results with the greater latency resulting from executing the query on the entire search space. The pagination token provided to the client corresponds to the values of the key with which the submitted query was augmented at block 401. Utilizing pagination tokens carried between the system and the client that correspond to searched partitions of the search space allows the system to track values of the key that have been incorporated in the query with low overhead and thus maintain state between partitioning events. The results and pagination token are returned to the submitter of the query (e.g., a client device) so that the resources satisfying the query within the partition of the search space are displayed on one or more pages between which the results can be navigated. Also, if the number N of values selected for the search space partition key was previously increased as part of a retry, the system can return the integer value of N to its initially configured value since results were successfully obtained.

At block 411, the system detects a trigger for the next iteration of query modification for search space partitioning. The trigger can correspond to selection of a GUI element (e.g., by a user) that invokes an API of the system by which a request for more results to be displayed on a subsequent page is communicated to the system. The pagination token is also communicated to the system as part of invoking the API to request the additional results. The system detects the trigger as a result of the pagination token being communicated to the system with the request. Operations continue at block 401 where another query modification is generated to continue traversing the search space.

Figure 5:
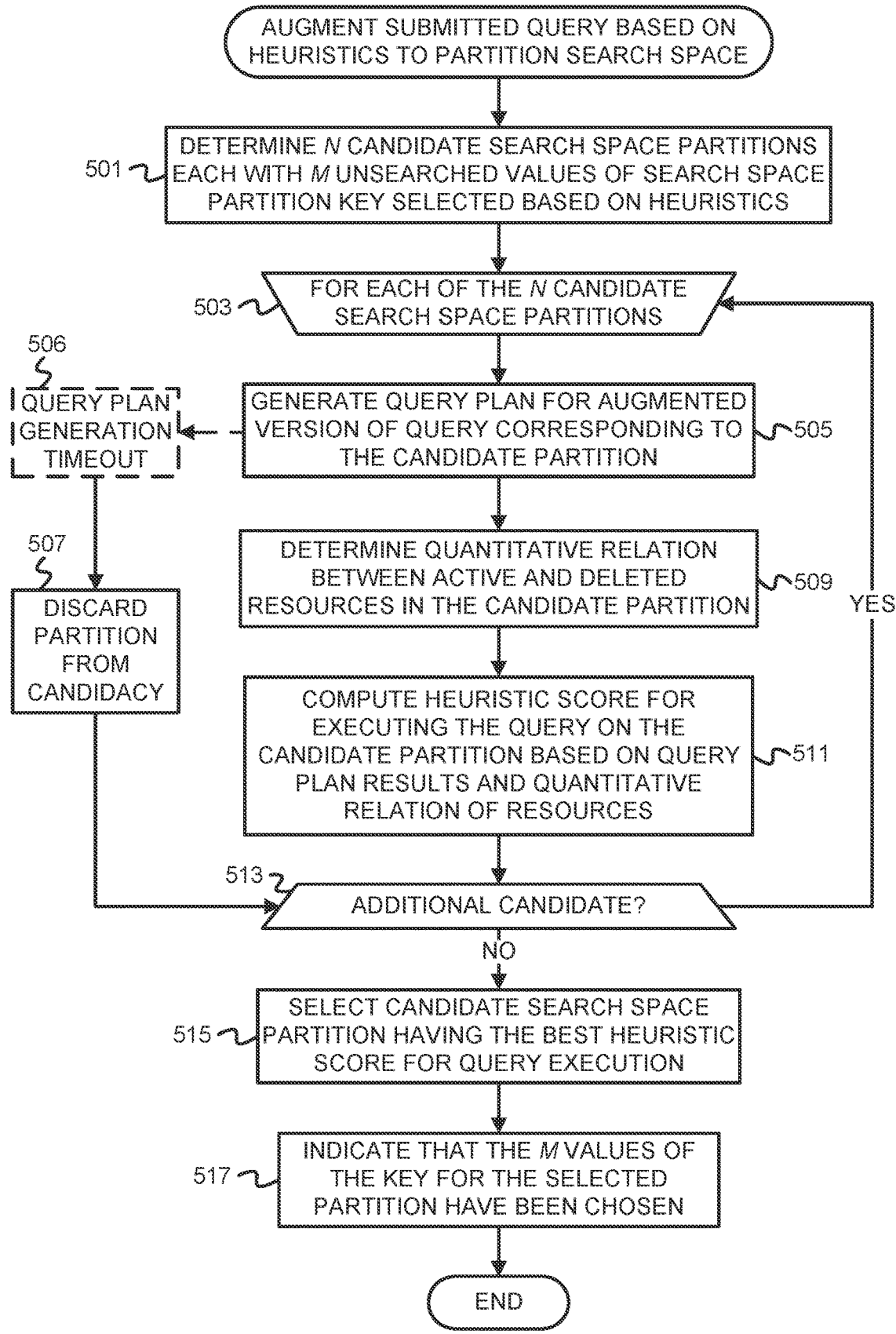
FIG. 5 is a flowchart of example operations for augmenting a submitted query based on heuristics to partition a search space.

FIG. 5 is a flowchart of example operations for augmenting a submitted query based on heuristics to partition a search space. The example operations assume that a query has been submitted for execution on a database that stores resources a vendor has allocated or provisioned to an end user having one or more accounts registered. The example operations also assume that the query is compatible with the query processor of the database (e.g., through the use of query templates, wrappers, etc.). For instance, with reference to FIG. 4, the augmentation of a submitted query at block 401 can be implemented with the example operations of FIG. 5.

At block 501, the system determines N candidate search space partitions that each have M unsearched values of a search space partition key (hereinafter "the key" for simplicity). The key is a field of data stored in the database by which data can be queried/selected based on at least a first value or condition (e.g., a threshold for values) specified in submitted queries. Examples of keys include an account (i.e., account name/identifier), region, and/or creation or insertion time associated with a resource in the database. The value of N corresponds to the number of search space partitions that are determined as candidates for execution of the query thereon, where each of the N candidates has a different combination of M candidate values of the key. In implementations, multiple keys may be designated (e.g., account and time, account, time and region, etc.). In such implementations, the system can be configured with a number M for each of the keys, where the number M can be the same across keys or different for at least a subset of the keys. As an illustrative example, the system may determine five candidate search space partitions, each of which has ten different values of the key. Each candidate partition is represented as an augmented version of the query that has appended thereto a predicate or clause that comprises the key and the M selected values. The resulting search space partition thus corresponds to a subset of the search space, or a subset of the resources in the database on which the query will be executed.

To determine each of the N candidate search space partitions, each of which corresponds to an augmented version of the query, the system selects the corresponding M values based on one or more heuristics. The system selects a set of M values that comprises at least one value that differs from any previously-selected set for another candidate query augmentation. The heuristics can be implemented as rules, a threshold(s), range(s) of values, and/or other criteria based on which the system can heuristically select the M best values of the key (as determined from evaluation based on the heuristics). Exemplary heuristics include those that indicate prioritization of values corresponding to the most recent, current, or otherwise up-to-date resources, those that are most relevant to the submitted query by having greater numbers of resources and corresponding records that can be examined, and/or those that are associated with greater relative counts of active resources to deleted resources. The system may determine multiple sets of values that can be considered best or highest priority based on corresponding ones of each of the heuristics and select the M values based on determining which of the values occur most frequently across the multiple sets. As an example, referring again to the account key, the system can determine sets of names/identifiers of the most recently accessed or updated accounts, accounts having the most resources associated with an API or service named in the query, and/or accounts having the highest ratios of active resources to deleted resources. The system can then determine the account names/identifiers occurring across each of these sets as belonging to a highest priority set from which at least some of the M values are selected. The system can cache the data obtained for the heuristic selection of values (e.g., resource counts and ratios) values determined to be higher priority for selection to facilitate subsequent query plan and augmentation operations. Additionally, if multiple keys have been designated, the keys can be associated with weights or priorities, where the system selects the M values for each key based on the weights or priorities of each key. For instance, if a first key has a higher priority than a second key, the system can prioritize selection of values for the first key over selection of values for the second key. As an example, if a value that is considered one of the best values for the second key based on the heuristics corresponds to a value of the first key that would not be selected based on the heuristics, the value of the second key can be omitted in favor of another value that yields a better evaluation based on the heuristics for a corresponding value(s) of the first key.

At block 503, the system begins evaluating each of the N candidate search space partitions. Each of the N candidate search space partitions corresponds to an augmented version of the query that comprises the query having a predicate or clause comprising the key and M selected values of the key appended thereto, such as a version of the query having appended a "WHERE" clause or "AND" conditional that comprises the key and the selected values.

At block 505, the system generates a query plan for the augmented version of the query corresponding to the candidate partition. The system can invoke functionality offered by the query language to generate the query plan. For instance, in SQL, the system can execute an "EXPLAIN" statement for the augmented version of the query. The system obtains an estimated count of records to be searched as part of generating the query plan. In implementations, the system may adjust the estimated count of records based on a coefficient or formula determined from prior observation or experimentation to increase accuracy of the estimate. The prior observation or experimentation may have resulted in development of the coefficient or formula based on comparisons of estimated record counts with actual record counts.

At block 506, generation of the query plan times out. Block 506 is depicted with dashed lines because the system may maintain a maximum time allotted for query plan generation (e.g., 1 second). If the time taken to generate the query plan exceeds this maximum time, the system can consider the plan generation to have timed out and can stop execution of the query plan generation. When a timeout occurs, at block 507, the system discards the search space partition from candidacy and discontinues heuristic evaluation of the partition.

At block 509, the system determines a quantitative relation between active and deleted resources that correspond to the candidate partition of the search space. The system may have previously determined counts of resources documented as active and resources documented as deleted for each possible value of the key (e.g., for each account name/identifier and/or region). The system determines the total counts of both active and deleted resources having values of the key that correspond to the M values thereof and determines the quantitative relation between the two counts by executing one or more queries on a database that stores the resource counts. For instance, for an "account" key (i.e., cloud/SaaS account name or identifier), the system determines the counts of active and deleted resources documented for the accounts represented in the M values. The quantitative relation can be represented as a ratio, proportion, decimal value, etc.

At block 511, the system computes a heuristic score for executing the query on the candidate partition of the search space based at least on the query plan results and quantitative relation of active and deleted resources. The system maintains heuristic scoring guidelines that indicate how to score a candidate partition and corresponding augmented version of a query based at least on the associated query plan and quantitative relation of active and deleted resources in the candidate partition. The heuristic scoring guidelines indicate guidelines for determining a score that accounts for at least the estimated number of searched records that may have been provided with the query plan and the quantitative relation of active and deleted resources in the candidate partition. The heuristic scoring guidelines may also indicate additional guidelines for scoring a candidate partition based on additional execution metric values that can be determined with the query plan, such as cost and estimated execution time. The heuristic scoring guidelines can comprise criteria for scoring a candidate and a corresponding value based on which to score the candidate. The criteria may comprise a threshold value(s), range(s) of values, etc.; if multiple thresholds or ranges are used, each threshold or range may have associated its own corresponding value based on which to determine the score.

The system can compute the score for the candidate by evaluating the execution metric(s) (e.g., estimated number of records) and quantitative relation based on the criteria and determining the score based on the values associated with each of the criteria. The system may, for instance, accumulate or otherwise aggregate the values corresponding to criteria satisfied to determine the score. Alternatively, or in addition, the system may assign the candidate a baseline or default score, where the baseline or default is adjusted based on the values corresponding to satisfied criteria. Adjustment of the baseline or default may be achieved through addition or subtraction of the values and/or adjusting the baseline or default by a coefficient, fraction, etc. depending on the procedure used for scoring. The computed score that results accounts for relative latency that can be expected from executing the augmented version of the query, where better scores correspond to lower relative latencies, and relative quantities of resources that are active as opposed to those that are deleted that will be searched, where better scores correspond to greater relative amounts of active resources.

At block 513, the system determines if there is another candidate partition of the search space remaining for evaluation. If there is another candidate remaining, operations continue at block 503. If there are no candidates remaining and each of the candidates has been evaluated or discarded (i.e., in the event of a timeout at block 506), operations continue at block 515.

At block 515, the system selects the candidate search space partition having the best heuristic score for query execution. Executing the query on the candidate search space partition refers to executing the augmented version of the query that executes over this partition of the database that corresponds to the M selected values of the key indicated in the augmentation to the query. The system evaluates the heuristic scores determined for each of the candidate partitions and selects the candidate having the best heuristic score for execution. The system can indicate the selected query plan and/or the corresponding augmented version of the query to the query processor that executes queries on the database.

At block 517, the system indicates that the M values of the key for the selected partition have been chosen. The system can indicate that the M values of the key have been chosen through creation of a page token corresponding to the values that is communicated to the client with the results of the query executed on the selected partition (e.g., as described in reference to block 409 of FIG. 4). The system may maintain a list or other data structure comprising values of the key that were heuristically selected and included in an executed query, such as a list or other data structure utilized to track created page tokens corresponding to selected values of the key. Adding the M values to the list or otherwise distinguishing the values from those that have not yet been chosen via creation of the page token allows the system to avoid duplication of results or searching overlapping partitions of the search space.

Figure 6:
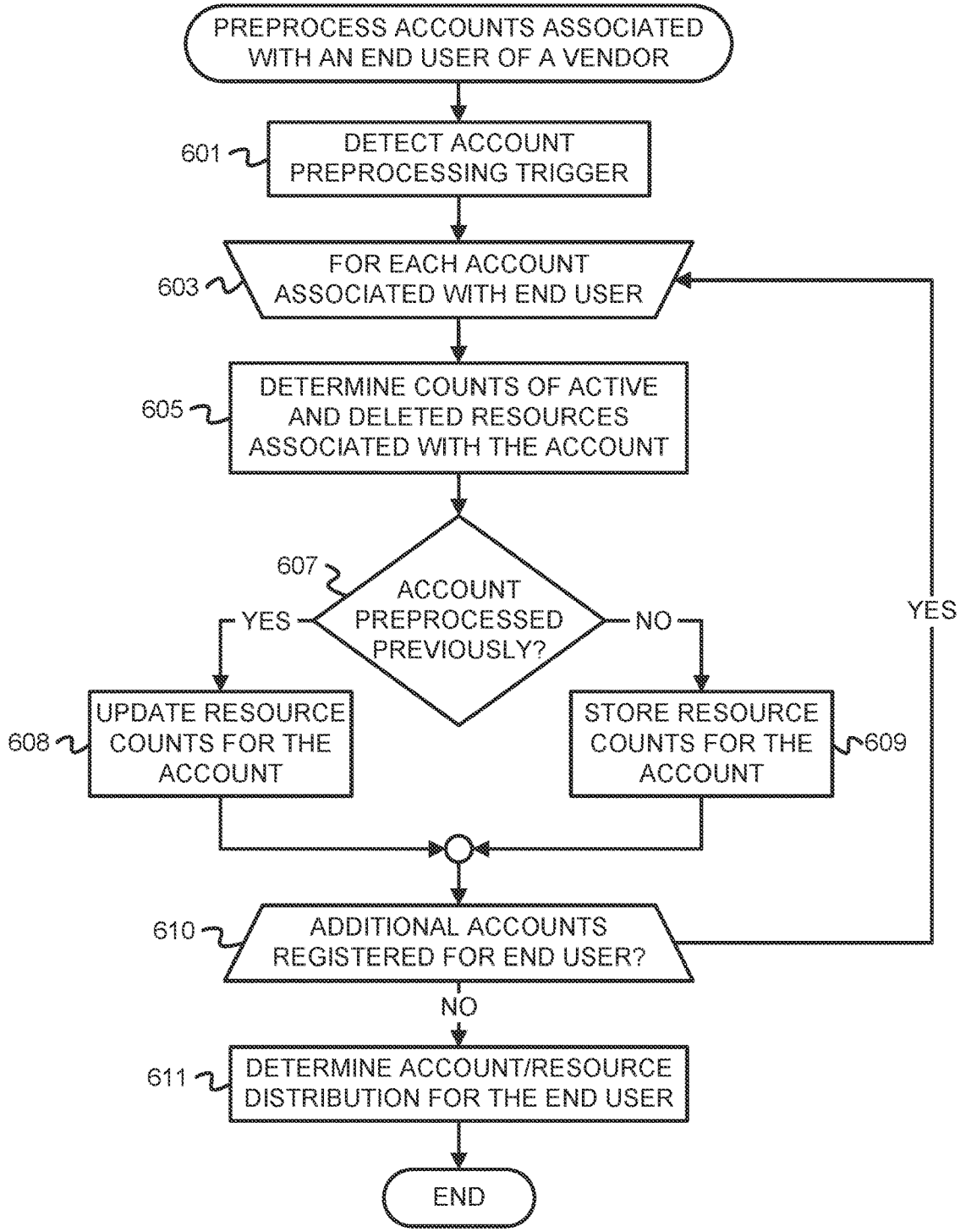
FIG. 6 is a flowchart of example operations for preprocessing accounts associated with an end user of a vendor.

FIG. 6 is a flowchart of example operations for preprocessing accounts associated with an end user of a vendor. As described above, the distribution of resources across accounts associated with an end user as well as the quantitative relation between active and deleted resources inform whether a search space should be partitioned for execution of a query and, if so, how to heuristically partition the search space. The resource distribution and quantitative relation can be determined based on information obtained from preprocessing.

The example operations refer to determining resource counts per account. However, if a different or additional search space partitioning key has been designated, the system can perform the example operations for each value in the domain of the search space partitioning key(s) alternatively or in addition. As an example, if the search space partition key is account and region, the system can perform the depicted operations for each account-region value pair.

At block 601, the system detects an account preprocessing trigger. Account preprocessing may be performed for an end user according to a schedule (e.g., weekly). Scheduled account preprocessing can proceed according to different schedules for different end users.

At block 603, the system begins determining resource counts for each account associated with the end user. The end user may have multiple accounts with the vendor if the end user is an organization.

At block 605, the system determines counts of active and deleted resources that are associated with the account. Deleted resources may still be associated with the account if they have been deleted from use by a user associated with the account, but their representative data have not yet been deleted or expunged from the database. The counts of active and deleted resources can be determined through submission of one or more queries to the database that indicate the account name/identifier and specifies the resource status(es) (i.e., active/created or deleted).

At block 607, the system determines if the account was preprocessed previously. The system has access to a database (or other data storage type) of account names/identifiers associated with an end user and, for each account, counts of both active and deleted resources. The system can ascertain whether the account has previously been preprocessed (e.g., during a previously scheduled preprocessing event) based on querying the database for the name or identifier of the account. The query result will indicate if an entry already exists for the account, and it has thus been preprocessed previously. If the account has been preprocessed, operations continue at block 608, where the system updates the entry maintained for the account with the determined counts of active and deleted resources. If the account has not been preprocessed, operations continue at block 609, where the system inserts the account name/identifier and the determined counts of active and deleted resources into the database to create a new entry.

At block 610, the system determines if there are any additional accounts registered for the end user. The system may be configured with a listing of active accounts registered for the end user that is updated as accounts are created or deleted, for example. If there are additional accounts remaining, operations continue at block 603. Otherwise, operations continue at block 611.

At block 611, the system determines a distribution of resources across accounts for the end user. The system determines total count of accounts associated with the end user and resources allocated across accounts. The system can create and store an indication of the distribution of resources across accounts based on these counts. For instance, the system can create an ordered pair or other representation of the data that indicates the number of accounts associated with the end user and the total number of resources allocated across accounts. The indication of the distribution can be used to determine whether the end user has a large quantity of accounts and/or resources stored in the database that may incur substantial latencies when the database is queried.

VARIATIONS

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 5, the operations depicted in blocks 503-513 can be performed at least partially in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
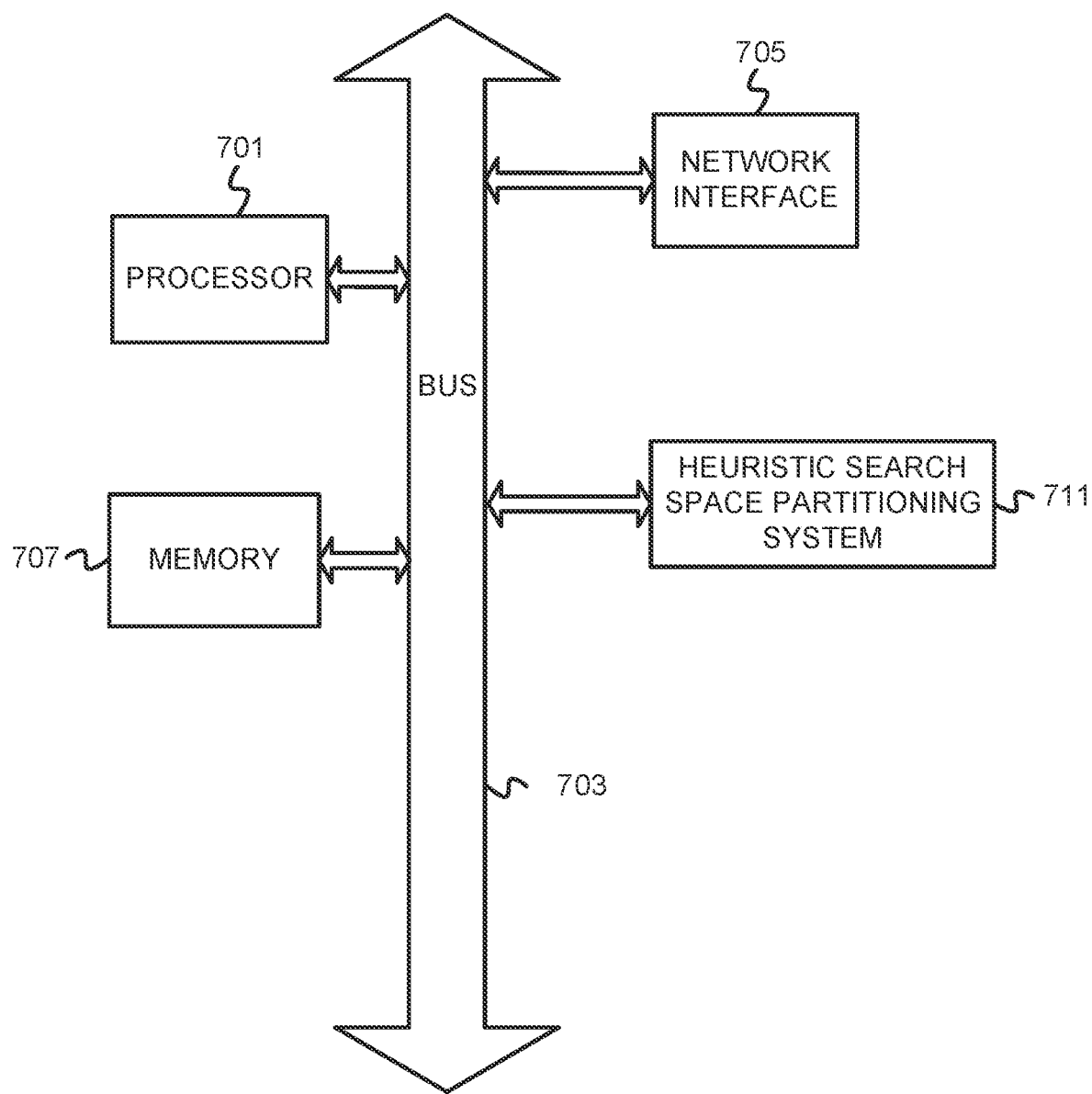
FIG. 7 depicts an example computer system with a heuristic search space partitioning system.

FIG. 7 depicts an example computer system with a heuristic search space partitioning system. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes heuristic search space partitioning system 711. The heuristic search space partitioning system 711 heuristically partitions a search space of a query to be executed on a database by determining a plurality of augmented versions of the query that are each executed over a subset of the search space with lower latencies than would be yielded by the query executed on the search space as a whole. The heuristic search space partitioning system 711 also paginates results that are returned from executing the query on partitions of the search space and utilizes pagination tokens for maintenance of state between augmented query execution events. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for heuristic database querying with dynamic partitioning as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
based on submission of a first query to a database, logically partitioning a search space of the database into a plurality of partitions for execution of the first query, wherein logically partitioning the search space comprises, for each of the plurality of partitions,
determining the partition of the search space, wherein determining the partition of the search space comprises selecting one or more values of a first key from a set of unsearched values of the first key based on first heuristics;
augmenting the first query with the first key and the one or more values of the first key to generate an augmented query, wherein augmenting the first query with the first key and the one or more values of the first key comprises appending, to the first query, the first key and the one or more values of the first key;
based on executing the augmented query, obtaining a subset of results of the first query, wherein the subset of results comprise data of resources maintained in the database that satisfy the first query and correspond to the partition of the search space; and
paginating the subset of results.

2. The method of claim 1, wherein appending, to the first query, the first key and the one or more values of the first key comprises appending to the first query a predicate or clause comprising the first key and the one or more values of the first key.

3. The method of claim 1, wherein determining the partition of the search space further comprises,
determining a plurality of candidate partitions of the search space;
generating a plurality of query plans corresponding to the plurality of candidate partitions, wherein the plurality of query plans comprises a first query plan corresponding to the partition of the search space;
evaluating the plurality of query plans; and
selecting the first query plan from the plurality of query plans for execution.

4. The method of claim 3, wherein determining the plurality of candidate partitions comprises, for each of the plurality of candidate partitions, selecting one or more unsearched values of the first key from the set of unsearched values based on the first heuristics, and wherein generating the plurality of query plans comprises generating the plurality of query plans for a plurality of augmented queries corresponding to the plurality of candidate partitions.

5. The method of claim 3, wherein evaluating the plurality of query plans comprises computing heuristic scores for the plurality of query plans based on second heuristics, and wherein selecting the first query plan is based on determining that the first query plan has a best one of the heuristic scores.

6. The method of claim 5, wherein computing the heuristic scores for the plurality of query plans based on the second heuristics comprises, for each query plan of the plurality of query plans and corresponding candidate partition of the plurality of candidate partitions, computing a heuristic score based on at least one of an estimated number of records to be searched associated with the query plan, an estimated execution time associated with the query plan, and a quantitative relation between active and deleted resources that correspond to the candidate partition.

7. The method of claim 1, wherein the database stores resources allocated to an end user by a Software-as-a-

Service (SaaS) application vendor or a cloud service provider (CSP), wherein the first query corresponds to the end user.

8. The method of claim 7, wherein selecting the one or more values of a first key based on the first heuristics comprises determining the one or more values that correspond to at least one of most recent or current ones of the resources based on updates to the database and most relevant ones of the resources based on quantities of resources associated with the one or more values.

9. The method of claim 7, further comprising determining, for each value in a domain of the first key, counts of active resources and deleted resources of the end user documented in the database in association with the value of the first key, wherein selecting the one or more values of a first key based on the first heuristics comprises determining the one or more values that correspond to a greatest quantitative relation between active resources and deleted resources.

10. The method of claim 7, further comprising determining a distribution of resources associated with the end user across values in a domain of the first key.

11. The method of claim 10, further comprising determining if the distribution of resources satisfies a criterion for heuristically partitioning the search space for execution of the first query, wherein heuristically partitioning the search space is based on determining that the distribution of resources satisfies the criterion.

12. One or more non-transitory machine-readable media having program code stored thereon, the program code comprising instructions to:
based on submission of a first query to a database, determine a logical partition of a search space of the database, wherein the instructions to determine the logical partition of the search space comprise instructions to select one or more values of a first key from a set of unsearched values of the first key based on first heuristics;
append the first key and the one or more values of the first key selected from the set of unsearched values to the first query to generate an augmented query;
obtain a subset of results of the first query resulting from execution of the augmented query, wherein the subset of results comprise results comprise data of resources maintained in the database that satisfy the first query and correspond to the logical partition of the search space; and
paginate the subset of results.

13. The non-transitory machine-readable media of claim 12, wherein the instructions to determine the logical partition of the search space further comprise instructions to,
determine a plurality of candidate partitions of the search space based on the first heuristics;
generate a plurality of query plans corresponding to the plurality of candidate partitions, wherein the plurality of query plans comprises a first query plan corresponding to the logical partition of the search space; and
based on evaluation of the plurality of query plans, select the first query plan from the plurality of query plans for execution.

14. The non-transitory machine-readable media of claim 13,
wherein the instructions to determine the plurality of candidate partitions comprise instructions to, for each of the plurality of candidate partitions, select one or more unsearched values of the first key from the set of unsearched values based on the first heuristics, and
wherein the instructions to generate the plurality of query plans comprise instructions to generate the plurality of query plans for a plurality of augmented queries that correspond to the plurality of candidate partitions.

15. The non-transitory machine-readable media of claim 12, wherein the program code further comprises instructions to repeat the determination of logical partitions of the search space, appending the first key and subsequently selected values of the first key to the first query, obtaining subsets of results of the first query, and pagination of the subsets of results for additional logical partitions of the search space until a search termination criterion has been satisfied.

16. An apparatus comprising:
a processor; and
a computer-readable medium having instructions stored thereon that are executable by the processor to cause the apparatus to,
based on submission of a first query to a database that stores resources allocated to an end user with which the first query is associated, for each of a plurality of logical partitions of a search space of the database,
determine the logical partition of the search space based on heuristic selection of one or more values of a first key from a set of unsearched values of the first key;
augment the first query with the first key and the one or more values of the first key based on appending the first key and the one or more values of the first key to the first query to generate an augmented query;
obtain a subset of results of the first query resulting from execution of the augmented query, wherein the subset of results comprise data of resources maintained in the database that satisfy the first query and correspond to the logical partition of the search space; and
paginate the subset of results.

17. The apparatus of claim 16, wherein the instructions executable by the processor to cause the apparatus to determine the logical partition of the search space based on heuristic selection of one or more values of the first key comprise instructions executable by the processor to cause the apparatus to select the one or more values of the first key from the set of unsearched values of the first key based on heuristics for selecting values of the first key.

18. The apparatus of claim 17, wherein the instructions executable by the processor to cause the apparatus to determine the logical partition based on heuristic selection of the one or more values comprise instructions executable by the processor to cause the apparatus to determine the one or more values that correspond to at least one of most recent or current ones of the resources based on updates to the database and most relevant ones of the resources based on quantities of resources associated with the one or more values.

19. The apparatus of claim 17, further comprising instructions executable by the processor to cause the apparatus to determine, for each value in a domain of the first key, counts of active resources and deleted resources of the end user documented in the database in association with the value of the first key, wherein the instructions executable by the processor to cause the apparatus to determine the logical partition based on heuristic selection of the one or more values comprise instructions executable by the processor to cause the apparatus to determine the one or more values that correspond to a greatest quantitative relation between active resources and deleted resources.

20. The apparatus of claim 16, further comprising instructions executable by the processor to cause the apparatus to:
- determine a distribution of resources associated with an end user to which the first query corresponds across values in a domain of the first key;
- determine if the distribution of resources satisfies a criterion for dynamic partitioning of the search space for execution of the first query; and
- based on a determination that the distribution of resources satisfies the criterion, logically partition the search space into the plurality of logical partitions.

* * * * *